United States Patent [19]
Kupietz

[11] Patent Number: 6,102,579
[45] Date of Patent: Aug. 15, 2000

[54] CAGE OR SET OF ROLLERS FOR ROLLER BEARINGS

[75] Inventor: Werner Kupietz, Bielefeld, Germany

[73] Assignee: The Torrington Company, Torrington, Conn.

[21] Appl. No.: 08/996,875

[22] Filed: Dec. 23, 1997

[30] Foreign Application Priority Data

Jan. 10, 1997 [DE] Germany ............................ 197 00 710
Mar. 18, 1997 [DE] Germany ............................ 197 11 310

[51] Int. Cl.$^7$ .................................................. F16C 33/46
[52] U.S. Cl. ........................ 384/572; 384/576; 384/578; 384/579; 384/580
[58] Field of Search ................................... 384/572, 573, 384/575, 576, 577, 578, 579, 580

[56] References Cited

U.S. PATENT DOCUMENTS

| | | |
|---|---|---|
| 1,426,578 | 8/1922 | Lott ........................................ 384/577 |
| 2,977,164 | 3/1961 | Witte ....................................... 384/576 |
| 3,387,901 | 6/1968 | Williams ................................. 384/576 |
| 4,155,606 | 5/1979 | Kispert et al. .......................... 384/576 |
| 4,492,415 | 1/1985 | Baile et al. ......................... 384/523 X |

FOREIGN PATENT DOCUMENTS

| | | | |
|---|---|---|---|
| 1256488 | 12/1967 | Germany ................................ 384/578 |
| 2121679 | 11/1972 | Germany ................................. 384/51 |
| 2831183 | 1/1980 | Germany ................................ 384/578 |

Primary Examiner—Thomas R. Hannon
Attorney, Agent, or Firm—John C. Bigler

[57] ABSTRACT

A roller bearing has a slatted cage assembly that includes a lateral ring with axial webs to retain bearing rollers on the inside or on the outside diameter of the cage assembly. The slatted cage assembly is closed off by a cage cover mounted on the free axial ends of the webs. The slatted cage assembly prevents loss of rollers before and during assembly of when used with a full-complement roller bearing.

12 Claims, 6 Drawing Sheets

CAGE OR SET OF ROLLERS FOR ROLLER BEARINGS

BACKGROUND OF THE INVENTION

This invention relates generally to a cage for a roller bearing, a roller bearing with a cage of this kind, a set of rollers for a roller bearing with a cage of this kind and methods for the production of such roller bearings or sets of rollers.

More particularly, the bearing rollers can be needle rollers or cylindrical rollers and the corresponding roller bearings can be needle or cylindrical-roller bearings. The bearings or bearing cages may be those in which webs which hold the bearing rollers apart in the circumferential direction are provided between the individual bearing rollers. However, the bearings of particular interest are full-complement bearings, i.e. bearings or sets of rollers in which the bearing rollers are in direct contact with one another along generatrices. Such full-complement bearings or bearing rings are advantageous when the radial loads on the roller bearing are high, i.e. when high static and/or dynamic load ratings are required. In such a case, a cage with webs between the rollers requires approximately ¼ of the pitch circle space between the bearing rollers and is therefore not available for the bearing rollers.

According to the prior art, the bearing rollers in full-complement roller bearings without webs between the bearing rollers can be held by lubricating grease or by individual mounting plugs between the rollers, or an assembly sleeve of cardboard or plastic can be used to retain the rollers during assembly. In all these cases, however, there is no security against the loss of rollers during or before assembly. Such arrangements are therefore not suitable for safety components such as vehicle steering systems.

A full-complement roller bearing with retention of the bearing rollers on the inside is known in practice. It has a one-piece welded sheet metal cage which prevents the bearing rollers from falling in the inward direction and which, after the assembly of the bearing, runs along loosely between the rollers on the inside of the latter. For reasons of assembly, a cage of this kind can only be employed with bearings that have a single fixed flange on the outer race. If the outer race is designed as a sleeve which is appropriately thin radially, a second bearing flange can be formed, after the assembly of the cage with the bearing rollers, by bending the sleeve over the axial end of the cage. The installation of the cage is thus complex, and there is virtually no possibility of guidance for the cage on the bearing flanges. Moreover, in the case of bearings under high loads or with high load ratings, the outer bearing race or the outer bearing sleeve, or even the bearing cage, can break.

In the case of thick-walled bearing sleeves, there is the risk, when bending over the case-hardened and subsequently soft-annealed edges, that cracks will appear in the bent-over bearing flanges at the bending radius due to the carburization. There is furthermore the possibility that, during the annealing of the bent-over edges, the track will be tempered at the transition and will become soft.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

An object on which the invention is based is to facilitate the assembly of the bearing cage or of the set of rollers and its fitting on the roller bearing and, for example, to allow the bearing cage to be used also for roller bearings with two fixed flanges on the outer race or inner race. At the same time, the intention is also to allow the use of the cage, in particular in the form of a set of rollers, as a unit between two bearing tracks, and to exclude the possibility that the bearing will jam if the bearing cage breaks. The bearing should also be suitable particularly for high bearing pressures at low speeds e.g. for steering gears of vehicles.

SUMMARY OF THE INVENTION

In one aspect of the invention, this is accomplished by providing a cage for a roller bearing, which comprises a slatted cage assembly that has a lateral ring with axial webs to retain bearing rollers, and a cage cover placed on the free axial ends of the webs.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
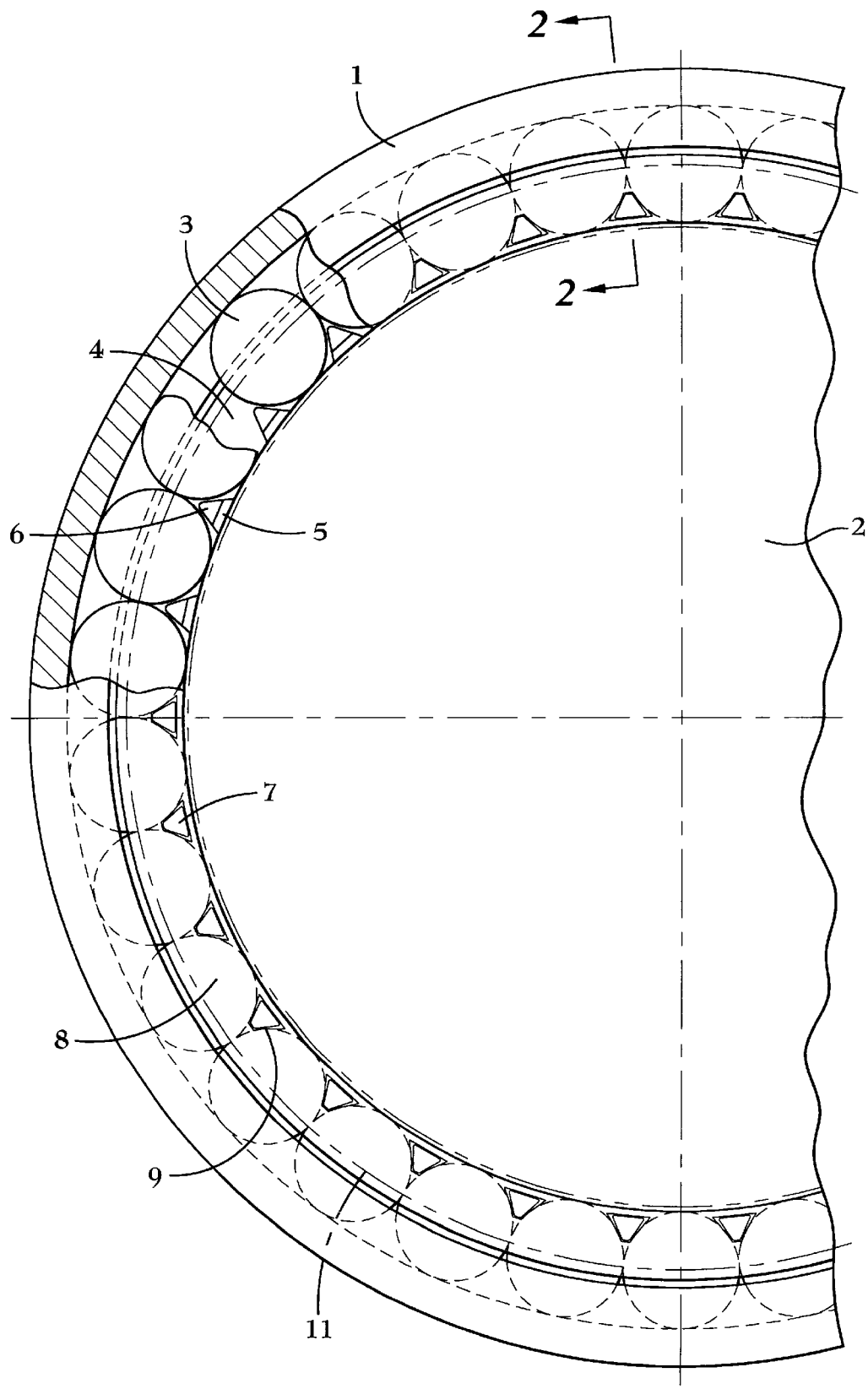
FIG. 1 shows a first exemplary embodiment of a roller bearing according to the invention in side view and partially in section.
Figure 2:
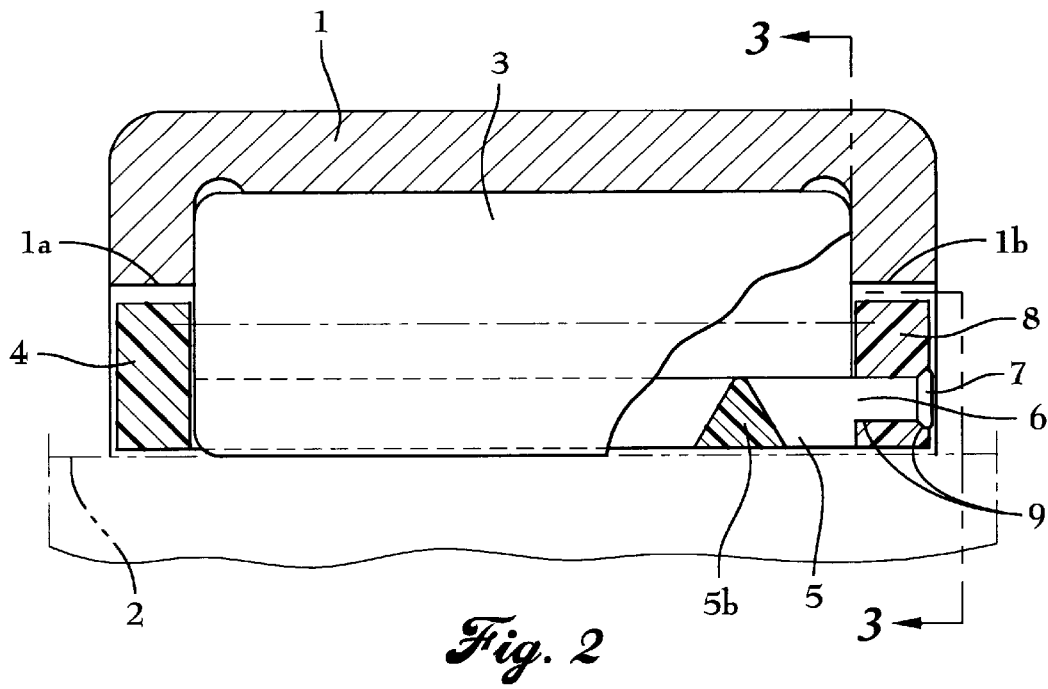
FIG. 2 shows an enlarged sectional view of the bearing of FIG. 1 along the line 2—2.
Figure 3:
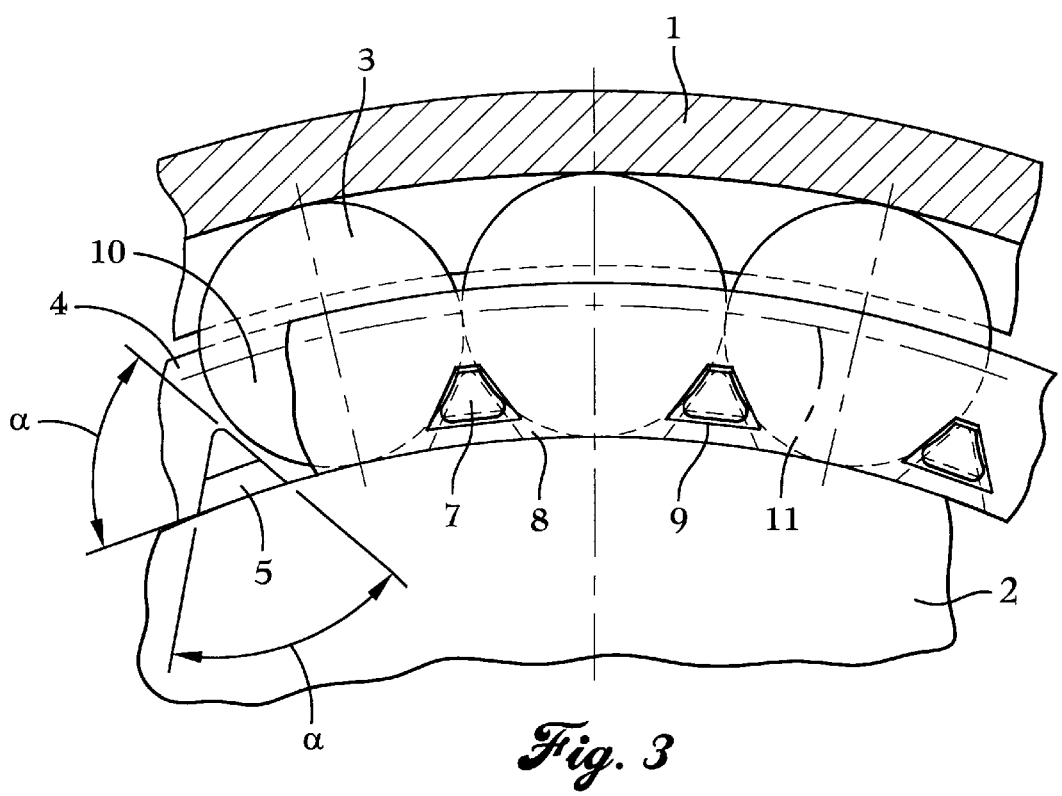
FIG. 3 shows a partial view of the bearing along the line 3—3 in FIG. 2 and partially in section.

In the exemplary embodiment shown in FIGS. 1 through 3, a roller bearing has an outer race 1 with two fixed, lateral, radially oriented bearing flanges la and lb. Bearing rollers 3 are arranged as a full-complement set of rollers between the bearing flanges la and lb within the race 1, and are each in mutual contact along a generatrix. Where this full-complement roller bearing is self-holding, the bearing rollers 3 support one another as in the arch of a bridge. During assembly, the last bearing roller 3 is deflected inward between two preceding bearing rollers. With a larger number of bearing rollers 3, especially with more than 18 bearing rollers, self-holding of the bearing rollers 3 is no longer possible in roller bearings of this kind with an outer race 1.

The bearing rollers 3 can be needle rollers or cylindrical rollers. In order to hold these bearing rollers fast in such a way as to prevent them from falling in the inward direction during the transportation of the bearing and during assembly or disassembly, a slatted cage assembly is provided and this has a lateral cage ring 4 at one axial end of the bearing and is provided at its inside diameter with axially extending webs 5. These webs 5 are situated at the radial inside of the bearing rollers 3, within the free space (pitch circle space) formed between the bearing rollers 3 and an inner bearing track 2, so that they do not require any additional space. They support the bearing rollers 3 against falling in the inward direction.

The free axial ends of the webs 5, which lie opposite the cage ring 4, are connected to a cage cover 8, which is placed on these ends, to form a slatted cage. In particular, the free axial ends of the webs 5 are fitted with extensions 6, which pass through passage openings in the cage cover 8. The extensions 6 can be designed as rivet-type extensions 6 with rivet heads 7, allowing the cage cover 8 to be riveted to the rivet heads 7 and thus be attached to the slatted cage assembly 4, 5. In order to facilitate introduction of the rivet-type extensions 6 axially from the inside during the assembly of the cage cover 8 and in order to accommodate the rivet heads 7 in the cage cover 8 on the outside, the through openings in the cage cover have recesses 9 on the inside and outside.

The slatted cage 4, 5, 8 is guided radially by means of the slatted cage assembly 4, 5 and the cage cover 8 on the inner bearing track 2, on which the bearing rollers 3 run also. In addition or as an alternative, the slatted cage assembly 4, 5 and the cage cover 8 can also be guided in the radial direction on the axially extending inside of the bearing flanges 1a and 1b of the outer race 1. The slatted cage assembly 4, 5 and its cage cover 8 are guided axially relative to the axial inner surfaces of the bearing flanges 1a and 1b by means of the bearing rollers 3 accommodated in the slatted cage. The axes of all the bearing rollers 3 lie on the pitch circle diameter 11.

The webs 5 of the slatted cage assembly 4, 5 have a triangular cross section, the base of which faces the inner bearing track 2 and the tip of which lies between two adjacent bearing rollers 3. In order to avoid jamming of the cage webs 5 between the bearing rollers 3 and the inner track 2 or a corresponding shaft, or indeed between two adjacent bearing rollers 3, the angle of contact α of the bearing rollers 3 at the point of contact 10 with the cage webs 5 and the angle of the web 5 relative to the inner track 2 are made as large as possible. The resulting cross section 5b of the cage webs 5 is advantageously an approximately equilateral triangle with an angle of contact a of about 60° (FIGS. 2 and 3). As a result, optimum use is made of the space between the bearing rollers 3.

The free axial ends of the webs 5 can be butt-joined to the inside of the cage cover 8, in particular welded to it (e.g. ultrasonic welding). However, it is advantageous to design the free axial ends of the webs 5 as extensions 6 which engage in through openings in the cage cover 8. In this embodiment too, it is possible to weld the extensions 6 to the cage cover 8. In addition to welding as described above, it is possible to use riveting, and this can be carried out in addition to, after or simultaneously with a welding process.

In principle, there is complete freedom in the choice of cross section for the extensions 6. To ensure better utilization of space, especially where the available cross sections are small, and/or to safeguard the webs 5 against rotation, a triangular cross section is advantageous for the extensions 6 and the through openings in the cage cover 8 (FIG. 3).

The lateral ring 4 and/or the webs 5 of the slatted cage assembly 4, 5 are preferably composed of plastic, in particular a glass-fiber-reinforced plastic. The cage cover too can be composed of the same material, and it is thus possible, in particular, to weld the cage components together.

In the assembly of the roller bearing in accordance with FIGS. 1 through 3, the bearing rollers 3 are first of all inserted into the outer race 1. If the bearing rollers 3 of a full set of rollers are not capable of holding themselves, e.g. if the number of rollers is too large, the rollers can be inserted into the outer race 1 by means of an inner assembly sleeve (not shown). The slatted cage assembly 4, 5 together with the webs 5 is then pushed into the pitch circle space between the bearing rollers 3 at the radially inner side. In this arrangement, the webs 5 do not project radially inward beyond the diameter of the bearing rollers 3, i.e. do not subsequently come into contact with the inner bearing track 2 during the operation of the bearing. Finally, the cage cover 8 is attached to the free axial ends of the webs 5, in particular placed on the extensions 6 of the webs 5 by means of its through openings and connected to them, as described above. It would be possible to hold the bearing rollers 3 during assembly by means of lubricating grease. However, this is not reliable enough and is also not always possible. During disassembly of the roller bearing, this means of holding the rollers would be ineffective since the lubricating grease would no longer be present.

Figure 4:
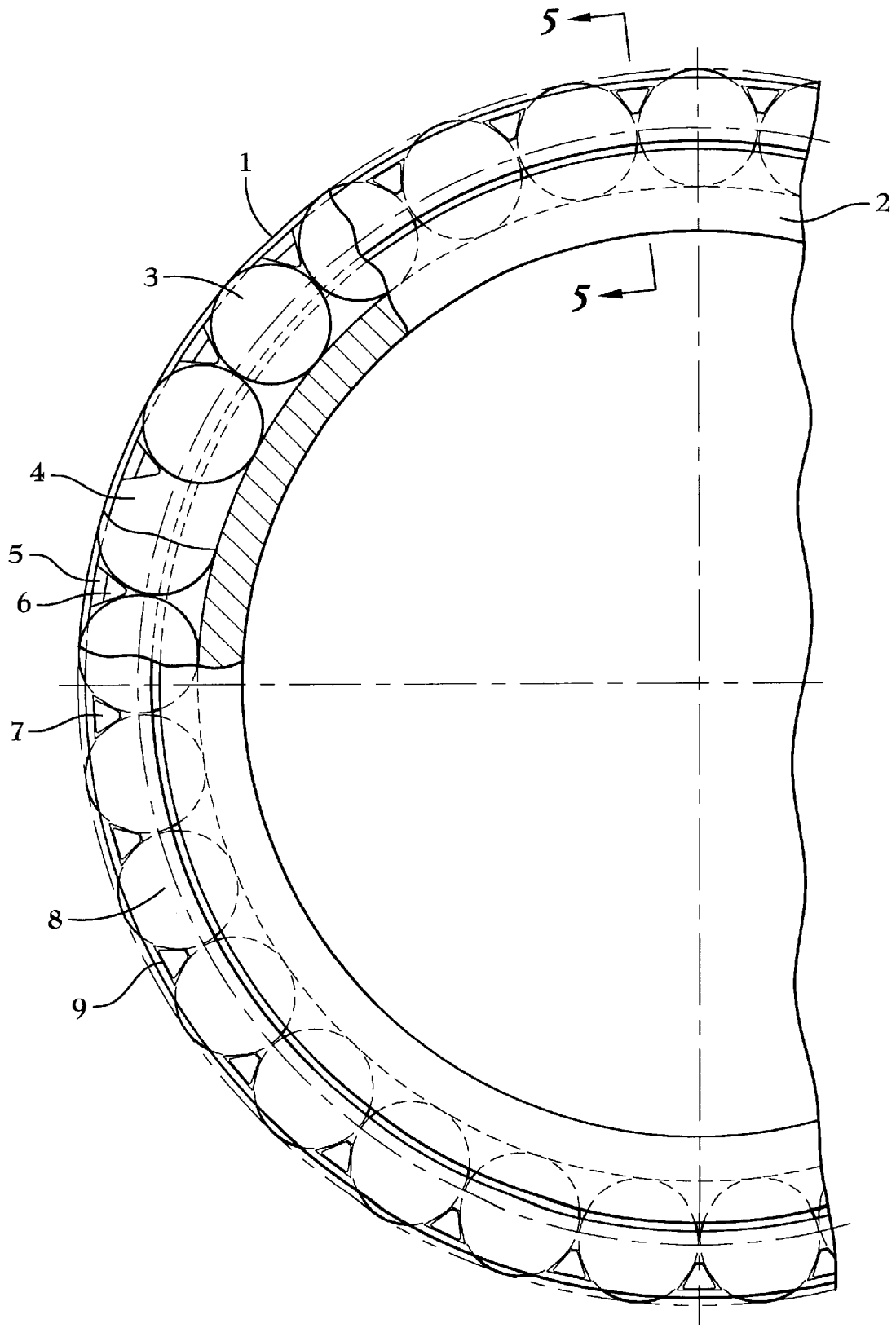
FIG. 4 shows a second embodiment of the roller bearing according to the invention in side view and partially in section.
Figure 5:
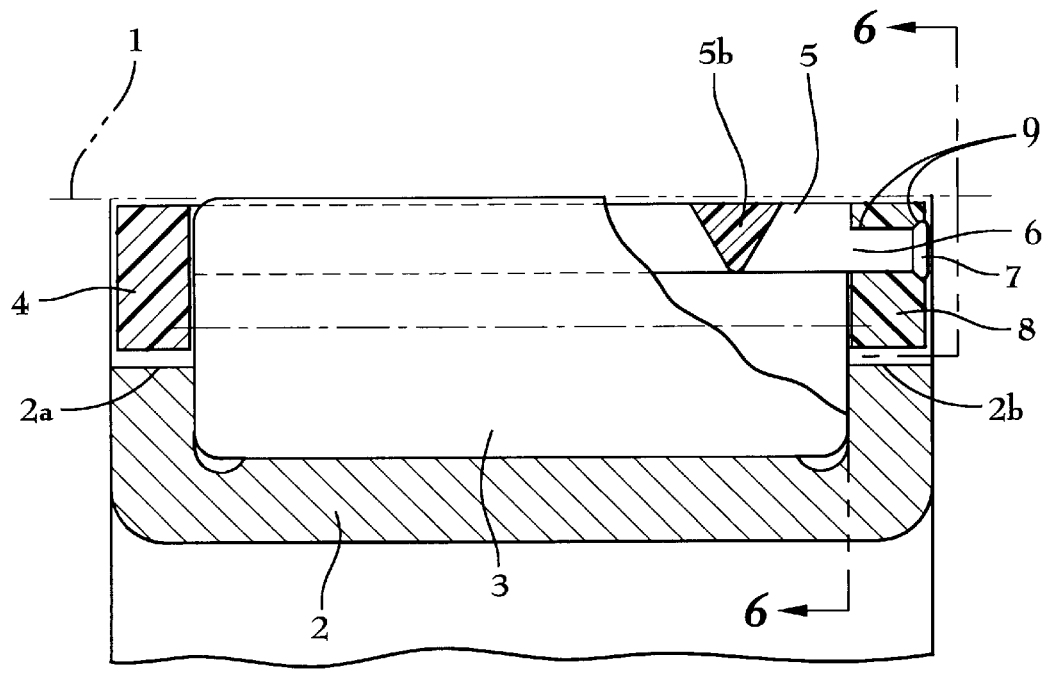
FIG. 5 shows an enlarged sectional view of the bearing in FIG. 4 along the line 5—5.
Figure 6:
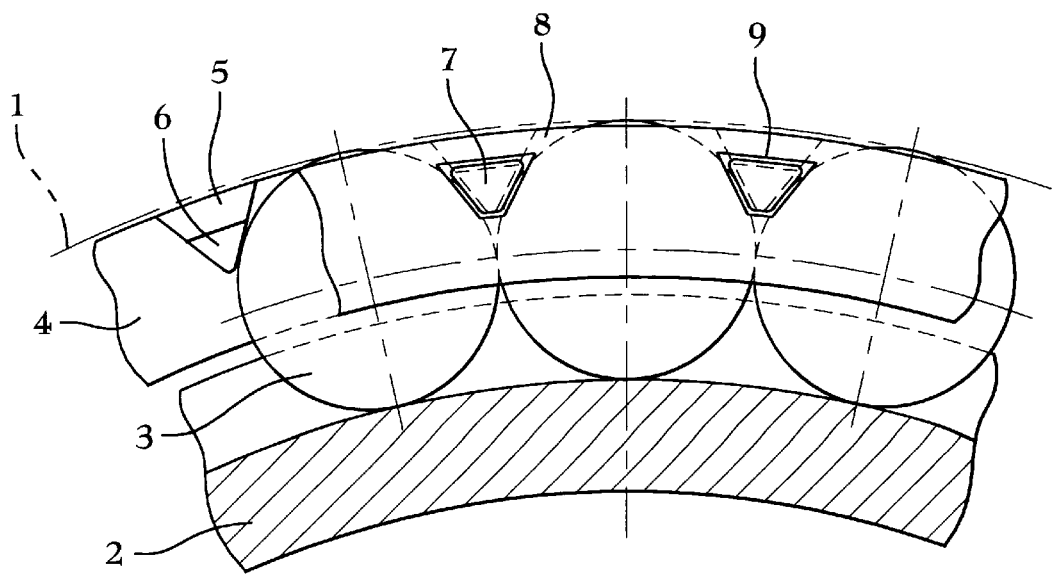
FIG. 6 shows a partial view of the bearing of FIG. 5 along the line 6—6 and partially in section.

FIGS. 4 through 6 show a roller bearing in which corresponding parts are indicated by the same reference numerals as in FIGS. 1 through 3. Essentially, only the differences relative to FIGS. 1 through 3 are described here. The inner track is formed by an inner bearing race 2 with two fixed lateral flanges 2a and 2b. The bearing rollers 3 are inserted into the inner race 2. During transportation and during assembly or disassembly, they are secured against falling out in the outward direction by webs 5 arranged at the radial outside of the slatted cage assembly 4, 5. In other respects, the design of this roller bearing or slatted cage together with the cage cover 8 corresponds essentially to the embodiment shown in FIGS. 1 through 3. The slatted cage assembly 4, 5 and the cage cover 8 are guided on an outer track 1. In addition or as an alternative, it is also possible for the ring 4 of the slatted cage assembly 4, 5 and of the cage cover 8 to be guided at the radial inside on the radially outer surfaces of the flanges 2a and 2b of the inner race 2. In the axial direction, the slatted cage formed by the slatted cage assembly 4, 5 and the cage cover 8 is held by the bearing rollers 3, which, for their part, are guided by the axial inside of the flanges 2a, 2b of the inner race 2.

During the production and assembly of the roller bearing in accordance with FIGS. 4 through 6, the bearing rollers 3 are first of all inserted into the inner race 2 or placed around the latter. To hold the bearing rollers 3 during this process, an outer assembly sleeve (not shown) may be necessary, this subsequently being removed. However, the assembly of the bearing with the assembly sleeve would be more difficult and not a reliable process. There is always the risk that the rollers will fall out if the assembly sleeve is removed prematurely. In the case of disassembly, the assembly sleeves are generally not available. Retention of the bearing rollers by means of grease is only reliable in the case of bearings with an outer race as shown in FIGS. 1 through 3.

When the slatted cage assembly 4, 5 according to the invention is used, the bearing rollers 3 are held against falling out in the outward direction by means of the webs 5. Thus, during assembly, the slatted cage assembly 4, 5 with its webs 5 is pushed into the free spaces (pitch circle space) between the bearing rollers 3 at the radially outer side. The cage cover 8 is then mounted on the free axial ends of the webs 5, in particular placed by means of its through openings on the extensions 6 of the webs and connected to them, in particular riveted or welded to them, similarly to the exemplary embodiment shown in FIGS. 1 through 3.

Figure 7:
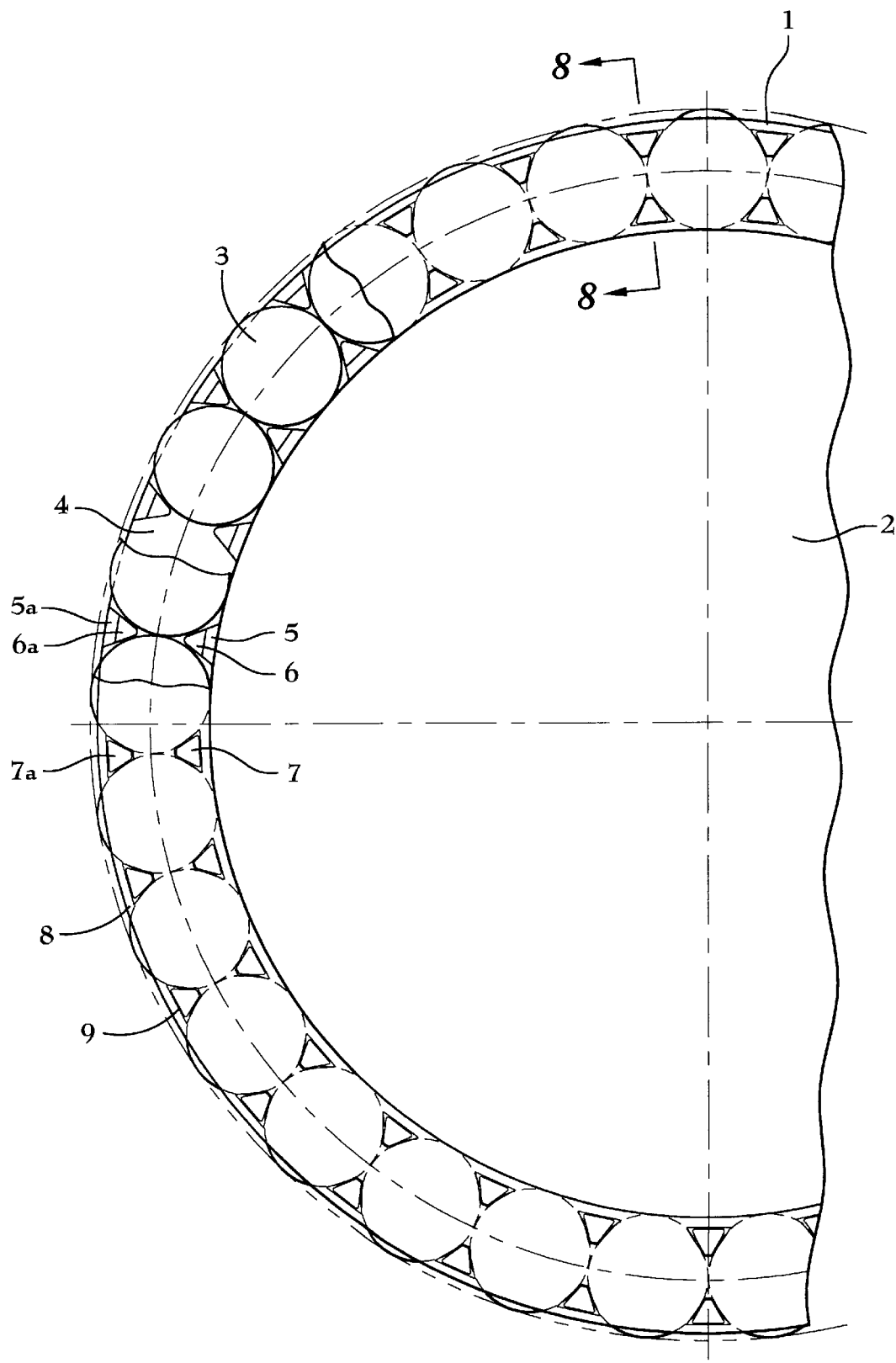
FIG. 7 shows an exemplary embodiment of a set of rollers according to the invention in side view and partially in section.
Figure 8:
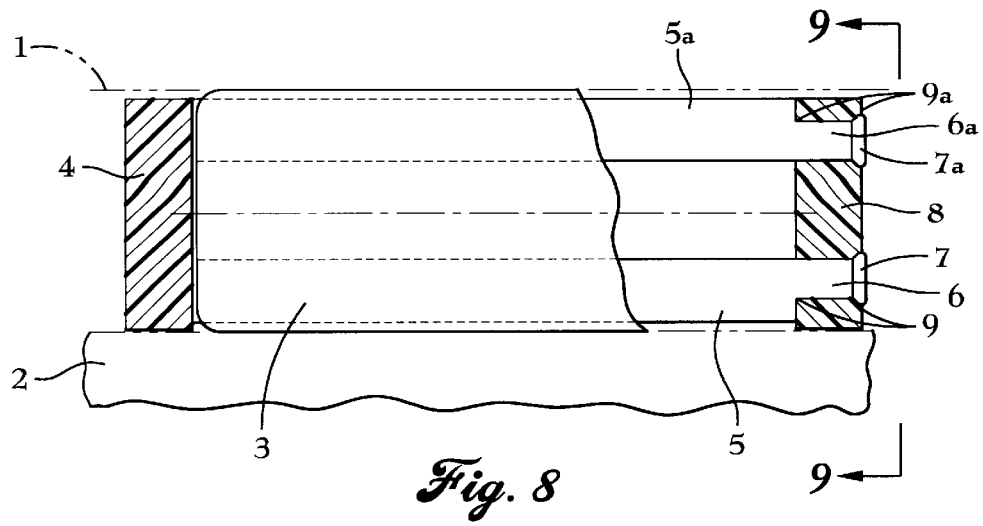
FIG. 8 shows an enlarged sectional view of the set of rollers along the line 8—8 in FIG. 7.
Figure 9:
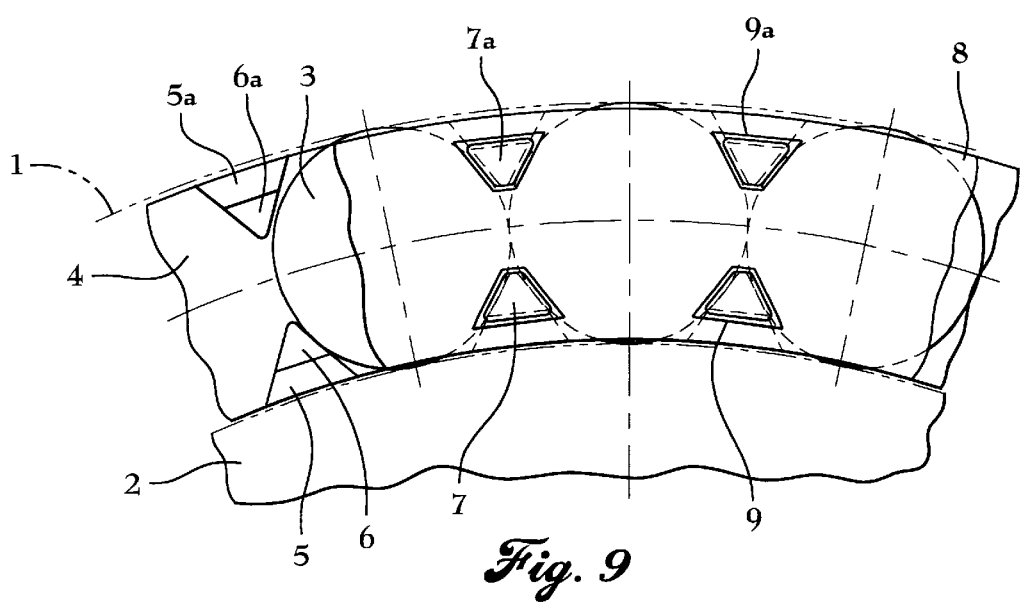
FIG. 9 is a partial view along the line 9—9 in FIG. 8.

FIGS. 7 through 9 show a further exemplary embodiment of a cage for a roller bearing. Parts which correspond to those in the exemplary embodiments shown in FIGS. 1 through 3 and in FIGS. 4 through 6 are indicated by the same reference numerals and are not described again here. However, the exemplary embodiment shown in FIGS. 7 through 9 is not a roller bearing with an inner race 2 or outer race 1 but a set of rollers or roller ring in which the bearing rollers 3 are not held by outer or inner bearing tracks 1 or 2 but solely by webs 5 and 5a at the radial inside and the radial outside of the bearing rollers 3.

According to FIGS. 7, 8 and 9, the slatted cage assembly has a lateral cage ring 4 with an inner ring of webs 5 and an outer ring of webs 5a. The two rings comprising webs 5 and 5a are completed by a common cage cover 8 to give a slatted cage. As with the preceding exemplary embodiments, the cage cover 8 has through openings, which correspond to the free axial ends or the extensions 6 and 6a of the webs 5 and 5a. Recesses 9 in the cage cover 8 facilitate the insertion of the extensions 6 and 6a at the axially inner side during assembly. On the axially outer side, the recesses receive the rivet heads 7 and 7a of the webs 5 and 5a. Instead of riveting, the free axial ends or the extensions 6 and 6a of the webs 5 and 5a can also be welded to the cage cover 8, e.g. by means of ultrasound.

The slatted cage thus formed secures the bearing rollers 3 (needle or cylindrical rollers) against falling out in the inward or outward direction and also in the axial direction during transportation and during assembly or disassembly. Between the inner webs 5 and the outer webs 5a, the bearing rollers 3 are thus held only by the slatted cage with the lateral ring 4 and the cage cover 8. The slatted cage is guided radially by means of the lateral ring 4 and the cage cover 8 during the mounting of the set of rollers on an inner track 2 or an outer track 1.

During the production of the set of rollers in accordance with FIGS. 7, 8 and 9, the bearing rollers 3 are first of all introduced between the webs 5 and 5a in the axial direction, in particular in the form of a full set of rollers with the bearing rollers 3 in mutual contact. The cage cover 8 is then placed on the free axial ends of the webs 5, 5a and riveted and/or welded.

Figure 8A:
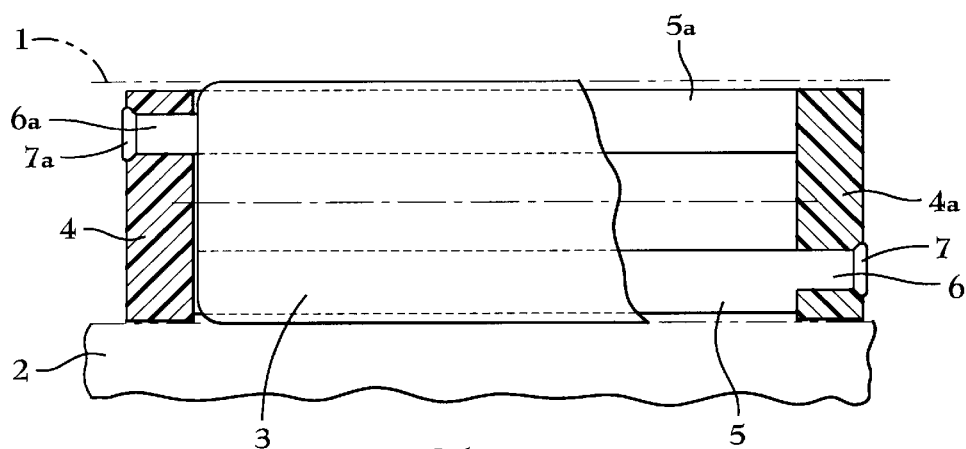
FIG. 8a shows a sectional view corresponding to that in FIG. 8 of another exemplary embodiment of the set of rollers.

FIG. 8a shows a modification of the set of rollers shown in FIGS. 7, 8 and 9. According to FIG. 8a, one slatted ring 4 and 4a is provided at each axial end of the slatted cage. Slatted ring 4 bears webs 5 on the inner circumference and slatted ring 4a bears webs 5a on the outer circumference. The webs 5 and 5a thus extend in opposite directions and toward one another from the rings 4 and 4a, giving an essentially mirror-image arrangement of two slatted cage assemblies.

During the production of a set of rollers of this kind shown in FIG. 8a, the bearing rollers 3 are first of all inserted in the axial direction between the radially inner webs 5 of the first slatted cage assembly 4, 5 or between the radially outer webs 5a of the second slatted cage assembly 4a, 5a. Here too, a full set of bearing rollers 3 can be used as in FIG. 9. The other slatted cage assembly 4a, 5a or 4, 5 in each case, together with its webs 5a or 5, is then pushed over the bearing rollers 3 at the radially outer side or radially inner side. Finally, the cage rings 4a, 4 are in each case mounted as cage covers on the free axial ends of the webs 5, 5a of the opposite cage ring 4, 4a. Here, the cage rings 4, 4a serve as a cage cover for the other slatted cage assembly 4a, 4 respectively. In particular, the cage covers 4a and 4 are placed by means of their through openings on the extensions 6 and 6a of the webs 5 and 5a and connected to them in the manner described above, in particular riveted or welded to them.

The set of rollers and the slatted cage can be guided, according to FIG. 8a, on an inner track 2 and/or on an outer track 1, with the aid of the cage rings 4 and 4a.

Sets of rollers of the kind shown in FIGS. 7 through 9 with double parallel or mutually opposed slatted cage assemblies to the inside and the outside of the bearing rollers 3 permit reliable retention of the bearing rollers during transportation, assembly and disassembly. With all the embodiments described, the complete slatted cage runs loosely between the bearing rollers 3 in the roller bearing thereby formed, after assembly.

In all cases, the webs 5 or 5a lie within the pitch circle space, i.e. within imaginary enveloping outer and inner surfaces formed by the bearing rollers 3, these surfaces corresponding in practice to the outer and inner tracks 1 and 2.

The slatted cage assembly of the present invention provides security against the loss of bearing rollers while avoiding the disadvantages of conventional bearing cages, which have to or could be inserted before or after the process of annealing and before or after the bending over of a bearing flange, as indicated above. The slatted cage assembly according to the invention can be inserted into a hardened bearing sleeve without the latter having to be reannealed.

Having described the invention, what is claimed is:

1. A cage for a roller bearing, which comprises a slatted cage assembly that has a continuous lateral ring with axial webs to retain bearing rollers, and a cage cover placed on free axial ends of the webs, wherein the bearing rollers touch each other to form a full-complement roller bearing.

2. The cage as claimed in claim 1, wherein the webs lie within an imaginary enveloping surface formed by the bearing rollers.

3. The cage as claimed in claim 1, wherein the webs have an essentially triangular cross section.

4. The cage as claimed in claim 3, wherein the cross section of the webs essentially forms an equilateral triangle.

5. The cage as claimed in claim 1, wherein the cage cover has through openings corresponding to the free axial ends of the webs and wherein the ends of the webs and the through openings have an essentially triangular cross section.

6. The cage as claimed in claim 5, wherein the webs bear, at their free axial ends, rivet-type extensions with rivet heads, which engage in the through openings in the cage cover.

7. The cage as claimed in claim 6, wherein the through openings in the cage cover have recesses as insertion aids for the free axial ends of the webs and to accept the rivet heads.

8. The cage as claimed in claim 1, wherein the webs are connected to the cage cover by means of their free axial ends by one of riveting and welding.

9. The cage as claimed in claim 1, wherein at least one of the lateral ring of the slatted cage assembly and of the cage cover serves as a guide for the cage relative to either a radially inner or a radially outer surface of a roller bearing.

10. The cage as claimed in claim 1, wherein at least one of the lateral ring, the webs of the slatted cage assembly and the cage cover is composed of glass-fiber-reinforced plastic.

11. A full-complement roller bearing with a cage comprising a slatted cage assembly that has a continuous lateral ring with axial webs to retain bearing rollers, and a cage cover placed on free axial ends of the webs, wherein: the roller bearing has an outer race with two fixed lateral radial bearing flanges that terminate radially outward of a centerline of the rollers, the webs are arranged on the inside diameter of the ring of the slatted cage assembly and of the cage cover, to the inside of the centerline of the bearing rollers, and the ring of the slatted cage assembly and the cage cover are guided on at least one of an inner track of the roller bearing and the axially oriented inner surfaces of the flanges at the outer race.

12. The full-complement roller bearing with a cage comprising a slatted cage assembly that has a continuous lateral ring with axial webs to retain bearing rollers, and a cage cover placed on free axial ends of the webs, wherein:

the roller bearing has an inner race with two fixed lateral radial bearing flanges that terminate radially inward of a centerline of the rollers, the webs are arranged on the outside diameter of the ring of the slatted cage assembly and of the cage cover, to the outside of the centerline of the bearing rollers, and the ring of the slatted cage assembly and the cage cover are guided against at least one of an outer track of the roller bearing and the axially oriented outer surfaces of the flanges of the inner race.

* * * * *